(12) United States Patent
Takahashi et al.

(10) Patent No.: US 11,048,471 B2
(45) Date of Patent: Jun. 29, 2021

(54) AUDIO SIGNAL PROCESSING APPARATUS, AUDIO SYSTEM, AND METHOD OF PROCESSING AUDIO SIGNAL

(71) Applicant: YAMAHA CORPORATION, Hamamatsu (JP)

(72) Inventors: Daisuke Takahashi, Hamamatsu (JP); Tadashi Morikawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/733,645

(22) Filed: Jan. 3, 2020

(65) Prior Publication Data
US 2020/0241831 A1 Jul. 30, 2020

(30) Foreign Application Priority Data
Jan. 30, 2019 (JP) .............................. JP2019-014016

(51) Int. Cl.
*G06F 3/00* (2006.01)
*G06F 3/16* (2006.01)
(Continued)

(52) U.S. Cl.
CPC .......... *G06F 3/165* (2013.01); *G06F 3/04847* (2013.01); *G06F 3/162* (2013.01); *H04S 3/008* (2013.01); *H04S 2400/01* (2013.01)

(58) Field of Classification Search
CPC ........... G06F 3/165; G06F 3/162; H04S 3/008
See application file for complete search history.

(56) References Cited

U.S. PATENT DOCUMENTS 7,412,367 B1 * 8/2008 Warlock .............. G06F 30/3323
  703/6
7,752,559 B1 * 7/2010 Szpak ...................... G06F 8/10
  715/764
(Continued)

FOREIGN PATENT DOCUMENTS

| EP | 2259458 A2 | 12/2010 |
| JP | H10302597 A | 11/1998 |
| JP | 2002169567 A | 6/2002 |

OTHER PUBLICATIONS

Harrison Mixbus 32C Digital Audio Workstation Pro Sound News, International38.8: 34. Future Publishing Ltd. (Aug. 2016).*

(Continued)

*Primary Examiner* — Nicholas Augustine
(74) *Attorney, Agent, or Firm* — Rossi, Kimms & McDowell LLP (57) ABSTRACT

The audio signal processing apparatus includes at least one bus a network interface, a user interface, a display, and a processor. The network interface outputs an audio signal through a second plurality of audio channels through a network. The user interface receives an operation from a user. The processor receives, from a destination device to which the audio signal is output, information about the number of available output channels of the destination device, controls the display to display a virtual bus representing the output channels of the destination device, received information regarding the number of output channels, receives input setting of a correspondence relationship between the second plurality of audio channels of the audio signal and the virtual bus, generates setting information according to the received input setting, and sends the audio signal outputted from the network interface the audio signal and the setting information to the destination device.

9 Claims, 11 Drawing Sheets

(51) Int. Cl.
   *G06F 3/0484*   (2013.01)
   *H04S 3/00*   (2006.01)
   *G06F 3/01*   (2006.01)

(56) References Cited

U.S. PATENT DOCUMENTS

| | | | | |
|---|---|---|---|---|
| 9,946,508 | B1* | 4/2018 | Lang | G06F 3/165 |
| 2009/0234477 | A1* | 9/2009 | Sekido | H04H 60/04 |
| | | | | 700/94 |
| 2012/0121105 | A1* | 5/2012 | Holladay | H04N 21/43615 |
| | | | | 381/81 |
| 2013/0073960 | A1* | 3/2013 | Eppolito | G11B 27/034 |
| | | | | 715/716 |
| 2016/0147293 | A1* | 5/2016 | Park | G06F 1/1694 |
| | | | | 381/334 |
| 2017/0358313 | A1* | 12/2017 | Shih | G10L 21/0264 |

OTHER PUBLICATIONS

Extended European Search Report issued in European Appln. No. 20154445.9 dated Jun. 16, 2020.

* cited by examiner

Prior Art

FIG. 11

AUDIO SIGNAL PROCESSING APPARATUS, AUDIO SYSTEM, AND METHOD OF PROCESSING AUDIO SIGNAL

CROSS REFERENCE TO RELATED APPLICATIONS

This Nonprovisional application claims priority under 35 U.S.C. § 119(a) on Patent Application No. 2019-014016 filed in Japan on Jan. 30, 2019 the entire contents of which are hereby incorporated by reference.

BACKGROUND OF THE INVENTION

1. Technical Field

A preferred embodiment of the present invention relates to an audio signal processing apparatus that inputs or outputs an audio signal, an audio system including such an audio signal processing apparatus, and a method of processing an audio signal.

2. Description of the Related Art

Patent Literature 1 (Japanese Unexamined Patent Application Publication No. H10-302597) and Patent Literature 2 (Japanese Unexamined Patent Application Publication No. 2002-169567) disclose a matrix device that mixes a plurality of input signals and distributes the input signals to a plurality of output channels.

SUMMARY OF THE INVENTION

An audio signal processing apparatus includes at least one bus, a network interface, a user interface, a display, and a processor. The at least one bus provides a first plurality of audio channels. The network interface outputs an audio signal through a second plurality of audio channels, among the first plurality of audio channels, through a network. The user interface receives an operation from a user. The processor implements instructions stored in a memory to execute a plurality of tasks. The plurality of tasks include an information receiving task, a displaying task, a setting receiving task, a setting generating task, and a sending task. The information receiving task receives, from a destination device to which the audio signal is output to via the network interface, information regarding a number of available output channels of the destination device. The displaying task controls the display to display a virtual bus representing the output channels of the destination device, based on the received information regarding the number of output channels. The setting receiving task receives, via the user interface, input setting of a correspondence relationship between the second plurality of audio channels of the audio signal and the virtual bus. The setting generating task generates setting information according to the received input setting. The sending task sends the audio signal and the setting information to the destination device via the network interface.

The above and other elements, features, characteristics, and advantages of the present invention will become more apparent from the following detailed description of the preferred embodiments with reference to the attached drawings.

DETAILED DESCRIPTION OF THE PREFERRED EMBODIMENTS

Conventional audio systems are not able to cope in a case in which the number of audio devices is larger than the number of output channels of a matrix device. In order to connect the larger number of audio devices than the number of output channels, a user has no choice but to replace the existing matrix device with a matrix device with more output channels or add a new matrix device. In a case of replacing or adding a matrix device, the user needs to redo the setting, which is troublesome to the user.

In view of the foregoing, a preferred embodiment of the present invention provides an audio signal processing apparatus, an audio system, and a method of processing an audio signal that are able to easily cope even when the number of audio devices is increased.

An audio signal processing apparatus according to a preferred embodiment of the present invention includes at least one bus, a network interface, a user interface, a display, and a processor. The at least one bus provides a first plurality of audio channels. The network interface outputs an audio signal through a second plurality of audio channels, among the first plurality of audio channels, through a network. The user interface receives an operation from a user. The processor implements instructions stored in a memory to execute a plurality of tasks. The plurality of tasks include an information receiving task, a displaying task, a setting receiving task, a setting generating task, and a sending task. The information receiving task receives, from a destination device to which the audio signal is output to via the network interface, information regarding a number of available output channels of the destination device. The displaying task controls the display to display a virtual bus representing the output channels of the destination device, based on the received information regarding the number of output channels. The setting receiving task receives, via the user interface, input setting of a correspondence relationship between the second plurality of audio channels of the audio signal and the virtual bus. The setting generating task generates setting information according to the received input setting. The sending task sends the audio signal and the setting information to the destination device via the network interface.

As a result, the user can easily cope even in a case in which the number of audio devices is increased.

Figure 1:
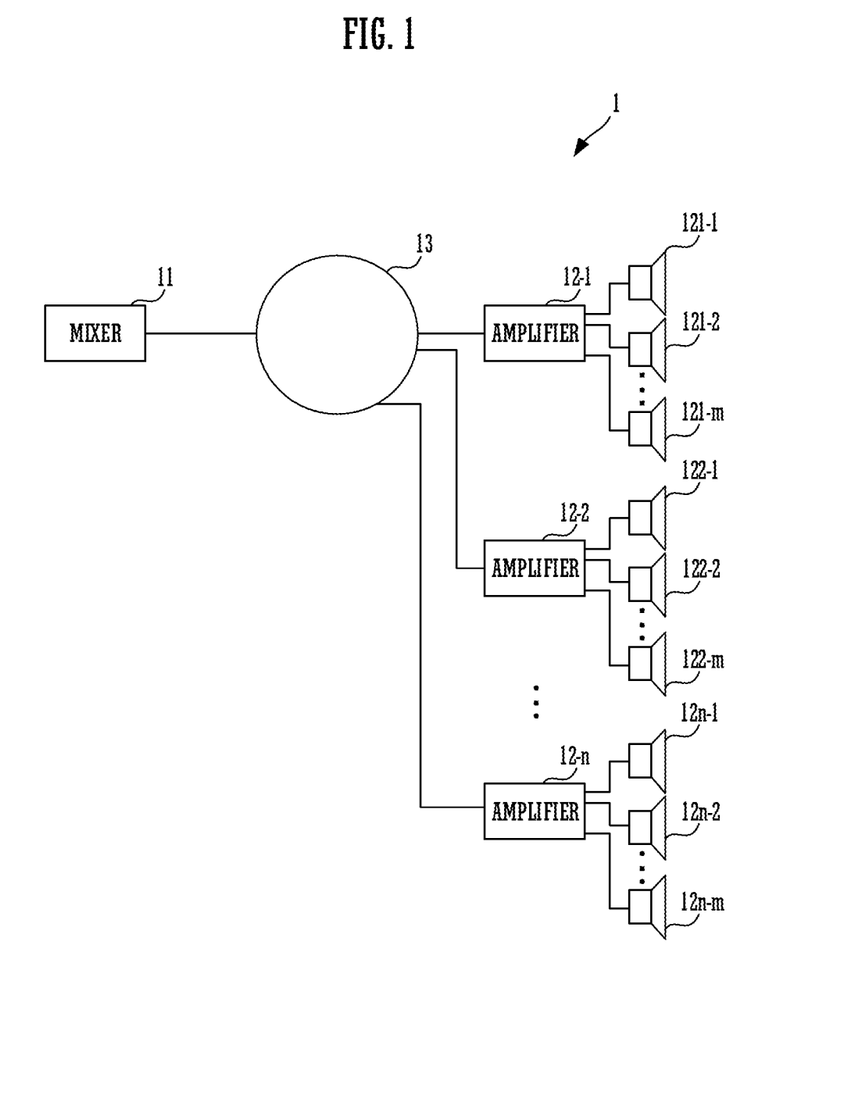
FIG. 1 is a block diagram showing a configuration of an audio system 1.

FIG. 1 is a block diagram showing a configuration of an audio system 1. The audio system 1 includes a mixer 11 connected through a network 13, and a plurality (n) of amplifiers 12-1 to 12-n. Each of the plurality of amplifiers 12-1 to 12-n is further connected to a plurality of speakers. For example, the amplifier 12-1 is connected to a plurality (m) of speakers 121-1 to 121-m.

The mixer 11 receives an audio signal of at least one first audio channel from one or more audio devices (not shown) such as microphones connected through the network. The mixer 11 outputs an audio signal of at least one second audio channel to the audio device such as the amplifier 12-1.

The amplifiers 12-1 to 12-n each receive the audio signal outputted from the mixer 11. The amplifiers 12-1 to 12-n output the audio signal to a plurality of speakers connected to the amplifiers. The plurality of speakers each emit a sound based on an inputted audio signal.

Figure 2:
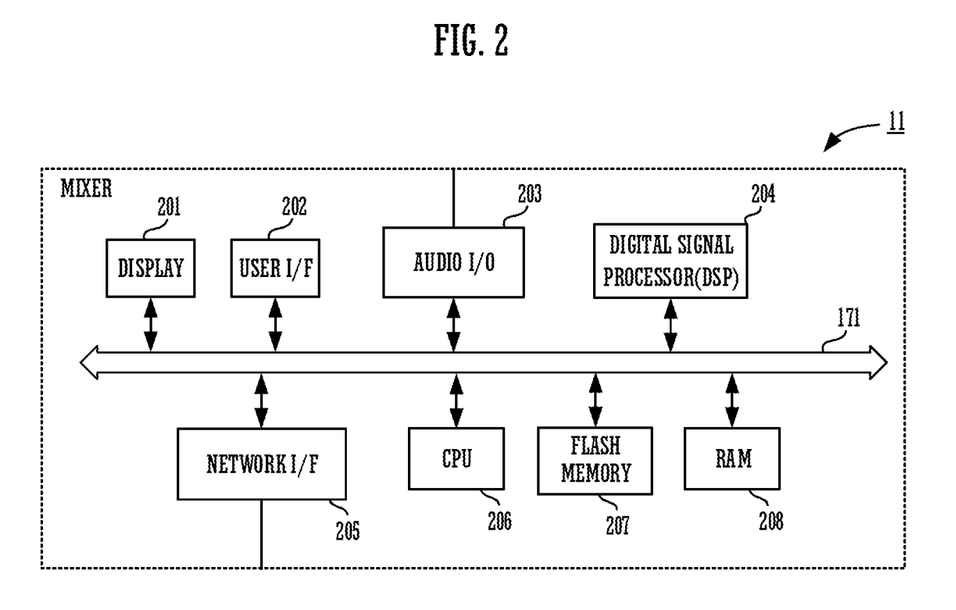
FIG. 2 is a block diagram showing a configuration of a mixer.

FIG. 2 is a block diagram showing a configuration of the mixer 11. The mixer 11 includes components such as a display 201, a user I/F 202, an audio I/O (Input/Output) 203, a digital signal processor (DSP) 204, a network I/F 205, a CPU 206, a flash memory 207, and a RAM 208. These components are connected to each other through a communication bus 171.

The display 201 includes an LCD (Liquid Crystal Display) or an OLED (Organic Light-Emitting Diode), for example, and displays various types of information. The user I/F 202 includes a switch, a knob, a touch panel, or the like, and receives an operation from a user. In a case in which the user I/F 202 is a touch panel, the user I/F 202 constitutes GUI (Graphical User Interface) together with the display 201.

The CPU 206 is a controller that controls the operation of the mixer 11. The CPU 206 reads and implements a predetermined program stored in the flash memory 207 being a storage medium to the RAM 208 and performs various types of operations.

It is to be noted that the program that the CPU 206 reads does not need to be stored in the flash memory 207 in the own apparatus. For example, the program may be stored in a storage medium of an external device such as a server. In such a case, the CPU 206 may read the program each time from the server to the RAM 208 to execute the program.

The digital signal processor 204 is configured with a DSP to perform various types of signal processing. The digital signal processor 204 performs signal processing such as mixing, on an audio signal inputted through the audio I/O 203 or the network I/F 205. The digital signal processor 204 outputs the audio signal that has been subjected to the signal processing, to other devices through the audio I/O 203 or the network I/F 205.

Figure 3:
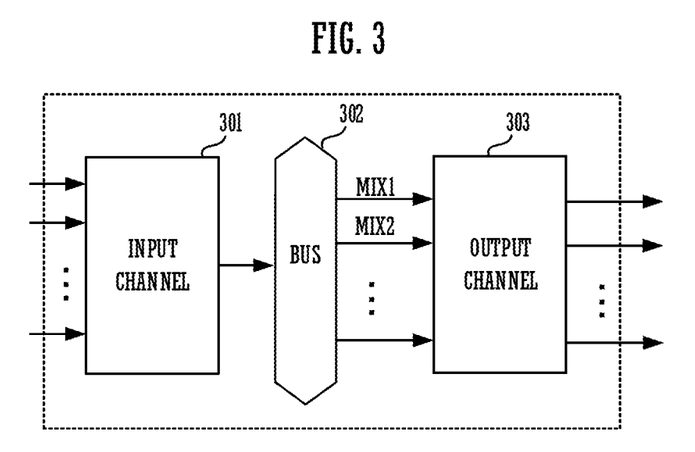
FIG. 3 is a block diagram functionally showing a configuration of signal processing.

FIG. 3 is a functional block diagram of signal processing executed by the digital signal processor 204 and the CPU 206. As shown in FIG. 3, the signal processing functionally includes an input channel 301, a bus 302, and an output channel 303.

The input channel 301 has a signal processing function of a plurality of channels (32 channels, for example). An input signal is inputted to each channel of the input channel 301. Each channel of the input channel 301 performs various types of signal processing on an input signal. In addition, each channel of the input channel 301 outputs the audio signal that has been subjected to the signal processing, to the bus 302 provided in the subsequent stage.

The bus 302 has a plurality of types of buses. The bus 302 has a plurality of types of buses such as a stereo bus, a mix (MIX) bus, or a matrix (MX) bus, for example. The stereo bus is a bus corresponding to a main speaker in a hall or a conference room. The mix bus is a bus for outputting an audio signal of one or more input channels to a specific location such as a monitor speaker. The matrix bus is used in order to further distribute the audio signal of the stereo bus or the mix bus to a plurality of speakers.

A user operates the user I/F 202 and sets an output level with respect to each bus for an input signal of each channel. Each bus in the bus 302, according to the set output level, mixes the audio signal to be inputted from the input channel 301.

The audio signal mixed by each bus is outputted to the output channel 303. The output channel 303 performs signal processing on the audio signal for each channel corresponding to each bus.

Subsequently, the audio signal that has been subjected to the signal processing is inputted to the audio I/O 203 or the network I/F 205. The network I/F 205 sends an audio signal of each output channel to a corresponding device (the amplifier 12-1, for example).

Figure 4:
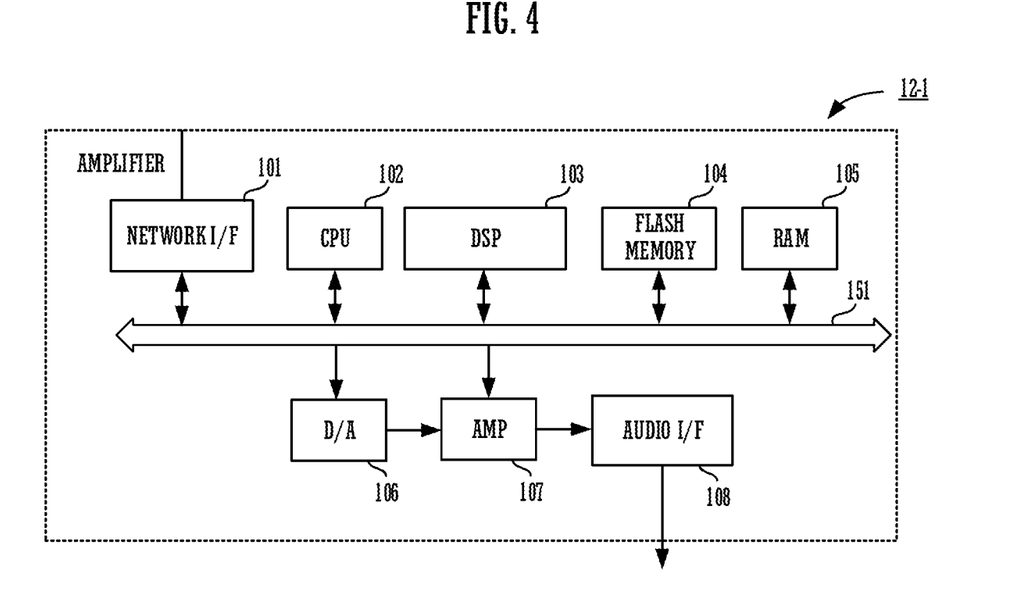
FIG. 4 is a block diagram showing a configuration of an amplifier.

FIG. 4 is a block diagram showing a configuration of the amplifier 12-1. It is to be noted that, since all the amplifiers 12-1 to 12-n have the same configuration, FIG. 4 shows the configuration of the amplifier 12-1 as a representative example.

The amplifier 12-1 includes a network interface (I/F) 101, a CPU 102, a DSP 103, a flash memory 104, a RAM 105, a D/A converter 106, a power amplifier (AMP) 107, and an audio interface (I/F) 108.

The network interface (I/F) 101, the CPU 102, the DSP 103, the flash memory 104, the RAM 105, the D/A converter 106, and the power amplifier (AMP) 107 are connected to a communication bus 151. The power amplifier 107 is connected to the D/A converter 106 and the audio I/F 108.

The CPU 102 reads the program stored in the flash memory 104 being a storage medium to the RAM 105 and implements a predetermined function. It is to be noted that the program that the CPU 102 reads does not also need to be stored in the flash memory 104 in the own apparatus. For example, the program may be stored in a storage medium of an external device such as a server. In such a case, the CPU 102 may read the program each time from the server to the RAM 105 to execute the program.

Figure 5:
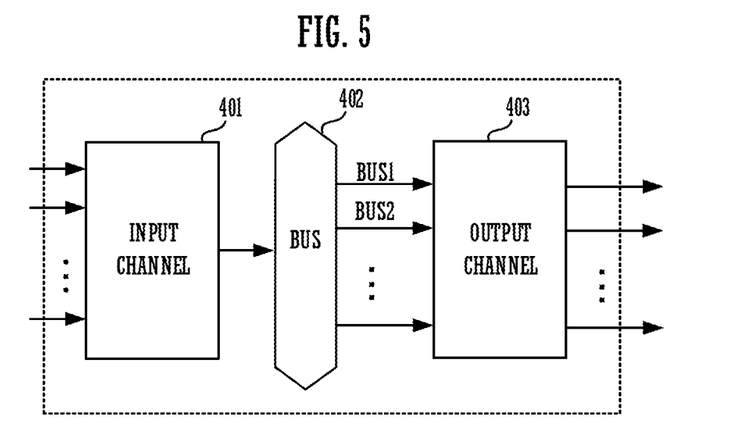
FIG. 5 is a block diagram functionally showing a configuration of signal processing.

FIG. 5 is a functional block diagram of signal processing executed by the CPU 102 and the DSP 103. As shown in FIG. 5, the signal processing functionally includes an input channel 401, a bus 402, and an output channel 403.

The input channel 401 has a signal processing function of a plurality of channels (16 channels, for example). An audio signal sent from the mixer 11 through the network I/F 101 is inputted to each channel of the input channel 401.

Each channel of the input channel 401 performs various types of signal processing on an input signal. In addition, each channel of the input channel 401 outputs the audio signal that has been subjected to the signal processing, to the bus 402 provided in the subsequent stage.

The bus 402 has a plurality of buses (eight buses of BUS 1 to BUS 8, for example). The output level with respect to each bus is performed based on setting information sent from the mixer 11. Each bus in the bus 402, according to the setting information, mixes the audio signal inputted from the input channel 401, according to the setting information.

The audio signal mixed by each bus is outputted to the output channel 403. The output channel 403 performs signal processing on the audio signal for each channel corresponding to each bus.

Subsequently, the audio signal that has been subjected to the signal processing is inputted to the audio I/F 108. The audio I/F 108 outputs an audio signal to the speakers 121-1 to 121-*m*.

Figure 6:
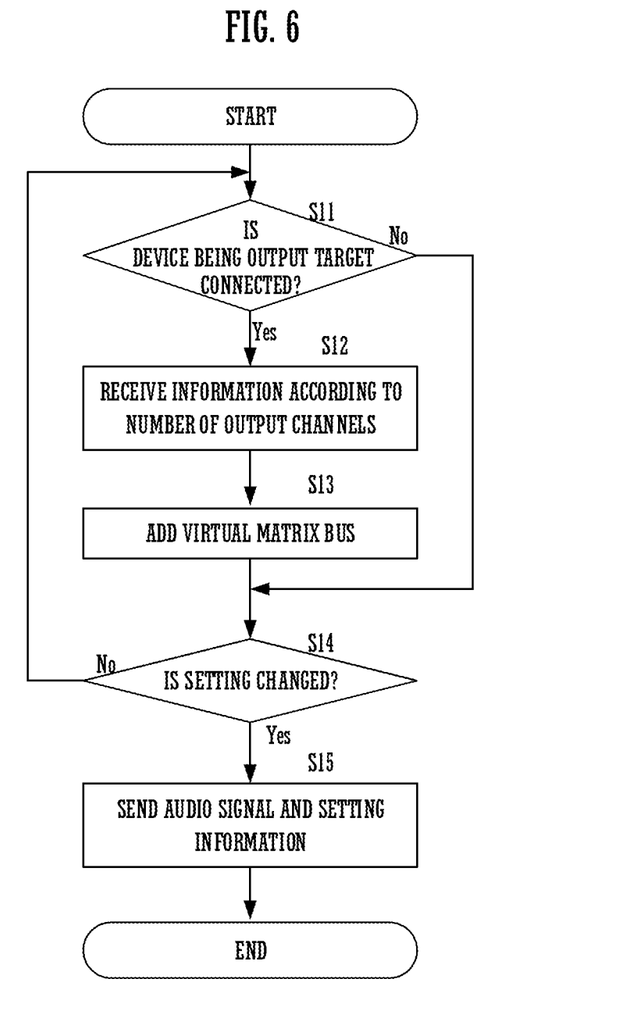
FIG. 6 is a flow chart showing an operation of the mixer.
Figure 7:
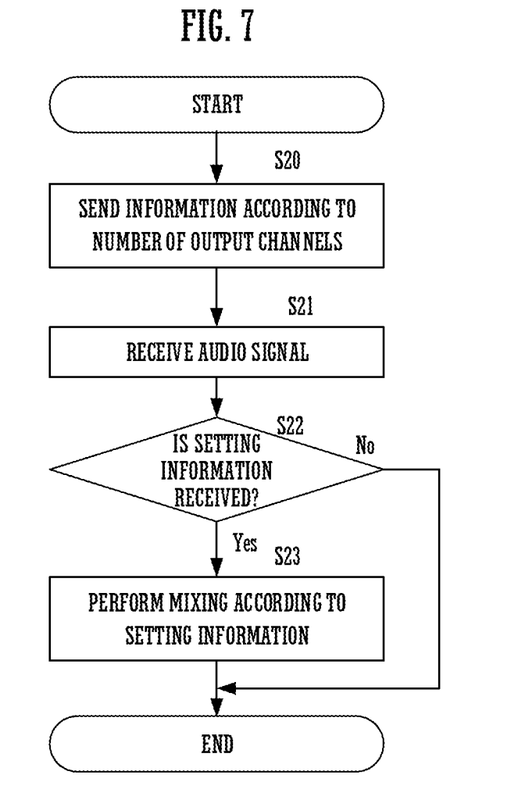
FIG. 7 is a flow chart showing an operation of the amplifier.

FIG. 6 is a flow chart showing an operation of the mixer 11. FIG. 7 is a flow chart showing an operation of the amplifier 12-1.

The mixer 11 first checks whether or not an audio device to be an output target, such as the amplifier 12-1, is connected to the network (S11). The mixer 11, in a case of determining that the audio device to be an output target is connected (Yes in S11), receives information according to the number of output channels from the audio device to be an output target (S12). For example, the amplifier 12-1 has eight output channels. The mixer 11 receives identification information (an IP address, a MAC address, or the like, for example) of the amplifier 12-1 and information according to the number of output channels.

Figure 8:
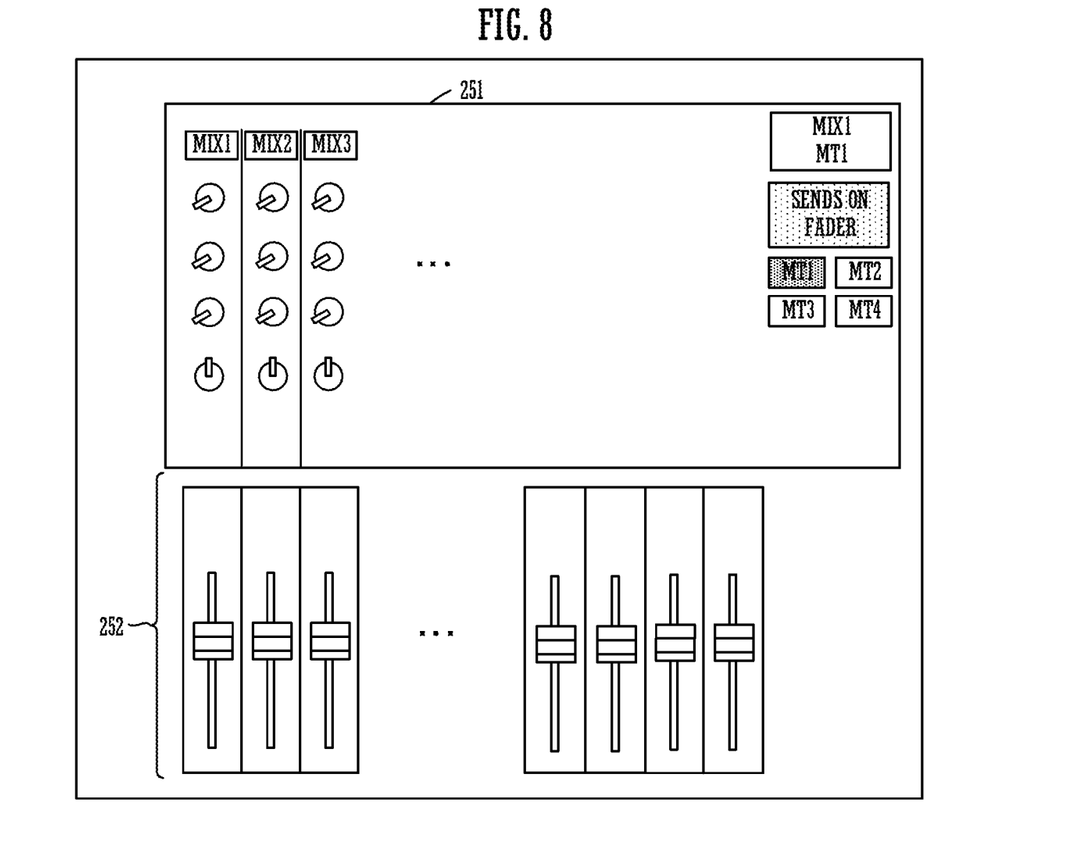
FIG. 8 is a plan view showing an example of a display and a user I/F.

The mixer 11 displays a virtual matrix bus on the display 201, based on received information (S13). FIG. 8 is a plan view showing an example of the display 201 and the user I/F 202.

As shown in FIG. 8, the mixer 11 includes a touch screen 251 as an operation panel, and displays a channel strip 252 on the operation panel. The touch screen 251 configures the display 201 and the user I/F 202. A fader physical controller is an example of the user I/F. It is to be noted that an actual mixer further includes the large number of knobs, switches, or the like.

The channel strip 252 is an area in which a plurality of physical controllers are disposed vertically. The channel strip 252 receives an operation with respect to one channel. In FIG. 8, although only one fader physical controller is disposed for each channel as a physical controller, in practice, a plurality of knobs, switches, or the like may be provided.

Normally, each channel of the channel strip 252 corresponds to an input channel. A user operates a fader physical controller of each input channel, and sets the input level of the audio signal with respect to each input channel. In addition, the user operates the knob of each input channel and sets up the output level from each input channel to a bus.

However, the fader physical controller in FIG. 8 functions as a physical controller for setting an output level with respect to each bus. When the user touches "SENDS ON FADER" displayed on the touch screen 251, the mixer 11 shifts to the SENDS ON FADER mode in which the fader physical controller is caused to function as a physical controller for setting an output level with respect to each bus.

In the example of FIG. 8, a matrix bus MT1 is selected. Each fader physical controller of the channel strip 252 corresponds to a MIX bus on an input side. The user, by operating each fader physical controller of the channel strip 252, can set the output level of each MIX bus with respect to the matrix bus MT1.

Figure 9:
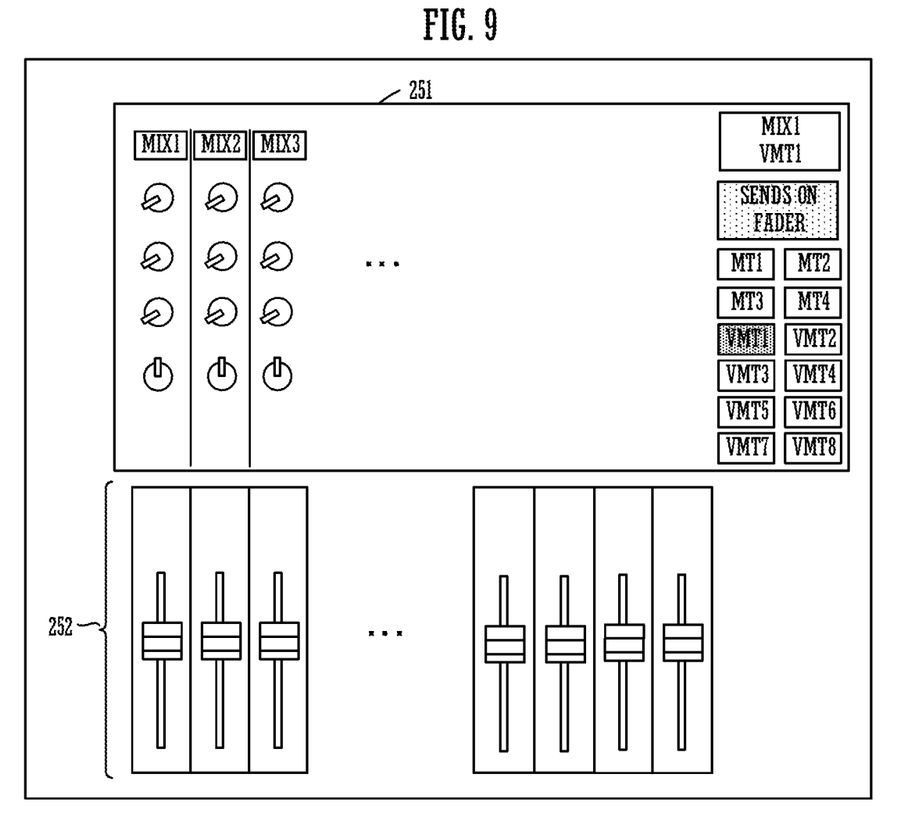
FIG. 9 is a plan view showing an example of a display and a user I/F.

FIG. 9 is a plan view showing an example of the display 201 and the user I/F 202 in a case in which a virtual matrix bus is displayed.

The mixer 11 displays on the touch screen 251 eight virtual matrix buses VMT1 to VMT8 corresponding to the eight output channels of the amplifier 12-1. In the example of FIG. 9, each fader physical controller of the channel strip 252 functions as a physical controller for setting the output level with respect to the virtual matrix bus VMT1. The user, by operating each fader physical controller of the channel strip 252, can set the output level of each MIX bus with respect to the virtual matrix bus VMT1.

In this manner, the mixer 11 receives information according to the number of output channels from a destination device, and, based on the information according to the number of output channels, displays a virtual bus that causes the output channel of the destination device to work as a bus of the own apparatus. As a result, the user can recognize as if the matrix bus has been extended.

The mixer 11 determines whether or not the fader physical controller is operated to change the setting of the virtual matrix bus (S14). It is to be noted that the mixer 11, in a case of determining in S11 that the audio device being an output target is not connected (No in S11), avoids processing of S12 and S13, and performs determination of S14.

The mixer 11, in a case of determining that the setting is not changed (No in S14), returns to determination of S11. The mixer 11, in a case of determining that the setting of the virtual matrix bus has been changed (Yes in S14), sends setting information to a corresponding audio device (S15), based on set content. In addition, the mixer 11 outputs an audio signal of all the output channels.

On the other hand, the amplifier 12-1 sends information indicating the number of output channels of the own apparatus (S20). The information indicating the number of output channels of the own apparatus may be periodically sent by broadcast to the network or may respond by unicast to an inquiry from the mixer 11.

The amplifier 12-1 receives the audio signal of each channel of the output channel 303 through the network (S21).

The amplifier 12-1 determines whether or not the setting information has been received (S22). The amplifier 12-1, in a case of determining that the setting information has been received (Yes in S22), performs mixing based on the received setting information (S23).

The setting information sent by the mixer 11 includes information relating to the output level, with respect to each virtual matrix bus, of the audio signal of each channel of the output channel 303 in the mixer 11. Each virtual matrix bus corresponds to each bus (an output channel) of the amplifier 12-1 being a destination device. For example, the virtual matrix bus VMT1 corresponds to the BUS 1 (the output channel 1) of the amplifier 12-1. Accordingly, the input channel 401 of the amplifier 12-1 outputs each audio signal to the BUS 1 at the output level with respect to the virtual matrix bus VMT1.

As a result, the setting of the virtual matrix bus received from the user by the mixer 11 is reflected in the amplifier 12-1.

Figure 10:
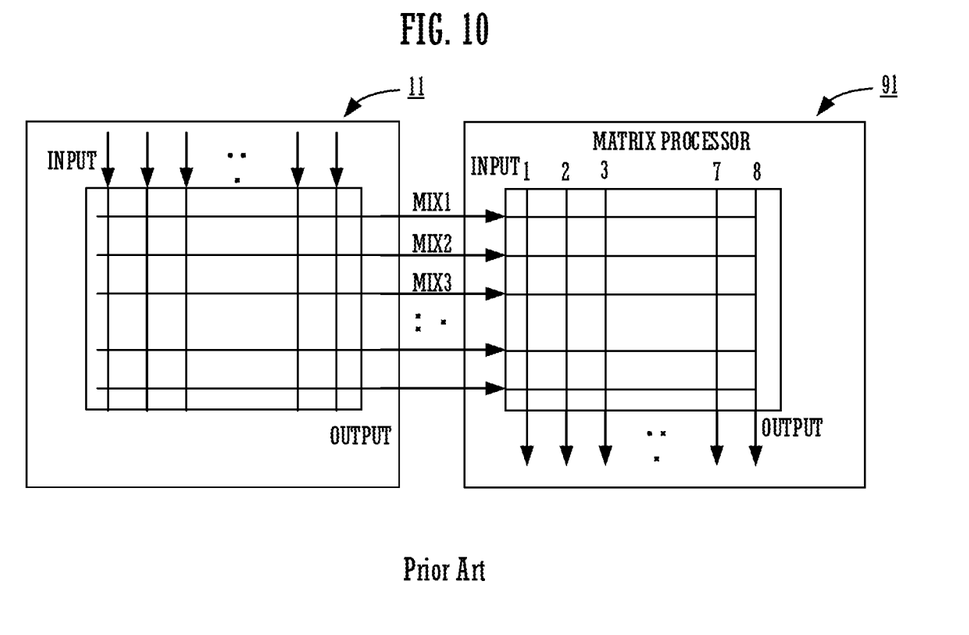
FIG. 10 is a conceptual diagram showing a function of a conventional matrix device.

FIG. 10 is a conceptual diagram showing a function of a conventional matrix device (a matrix processor) 91 as a reference example. Conventionally, a user, in a case in which the number of output channels of the mixer 11 is larger than the number of buses, has connected the matrix processor 91 and has redistributed the audio signal of the output channel. The conventional matrix processor 91 distributes the audio signal of each output channel that has been outputted from the mixer 11, and outputs the audio signal to an audio device such as an amplifier. The user sets the output level of the audio signal of each output channel by using the user I/F of the matrix processor or dedicated application software.

At this time, in a case in which a user desires to connect the larger number of audio devices than the number of output channels of the matrix processor 91, the user needs to replace the existing matrix processor with a matrix processor with the large number of output channels or add a new matrix processor 91. In addition, in a case of replacing or adding a matrix processor, the user needs to redo the setting, which is troublesome to the user.

Figure 11:
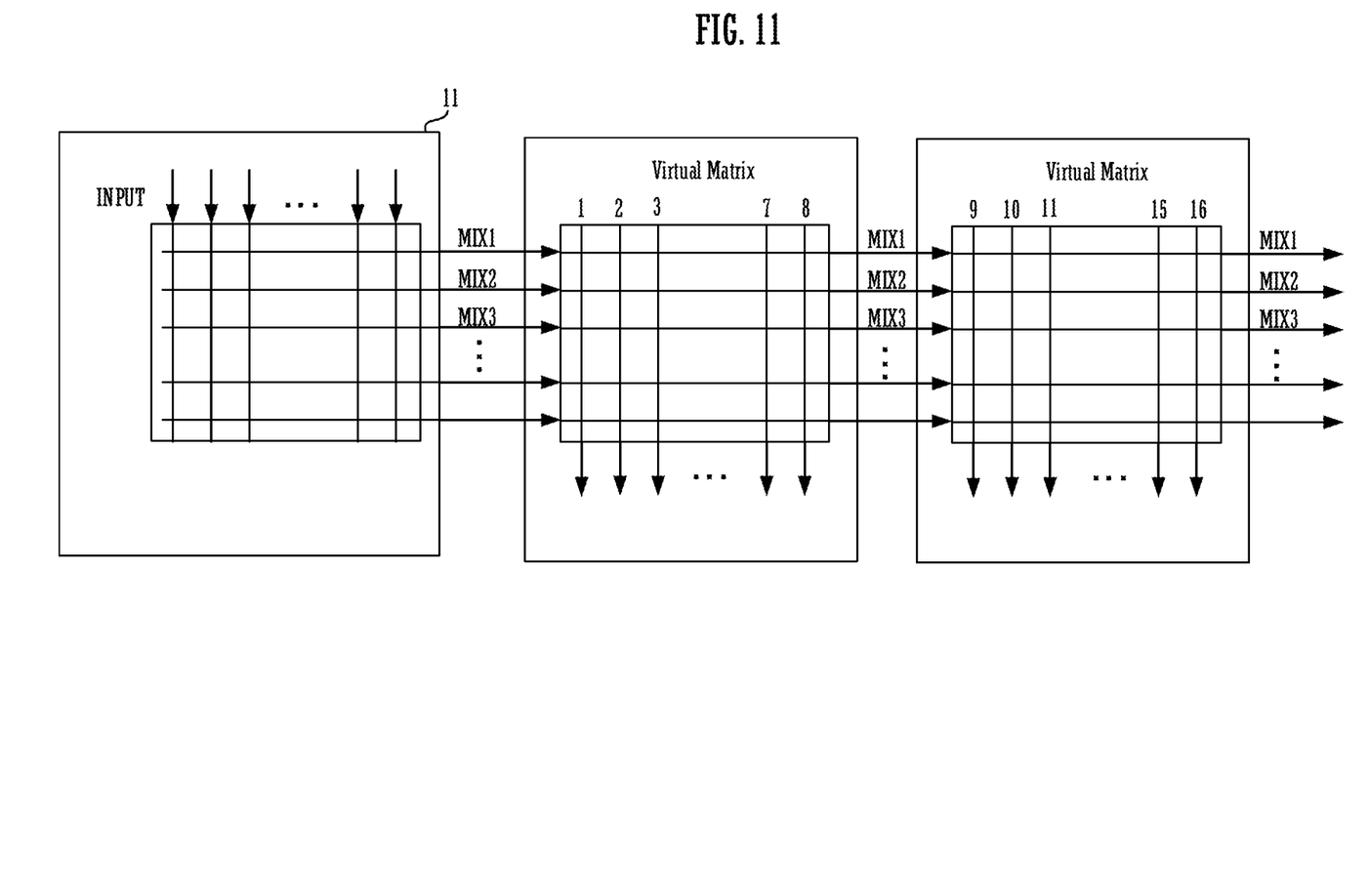
FIG. 11 is a conceptual diagram showing a function of a virtual matrix bus according to a preferred embodiment of the present invention.

In contrast to this case, FIG. 11 is a conceptual diagram showing a function of a virtual matrix bus according to the present preferred embodiment of the present invention. The mixer 11 sets a virtual matrix bus of the own apparatus in a case in which an audio device having a plurality of output channels is connected through a network. The mixer 11 increases or decreases the number of virtual matrix buses of the own apparatus, according to the number of output channels is increased or decreased. The mixer 11 outputs the audio signal of the output channel and the setting information. The actual redistribution of the audio signal is performed in each audio device, based on the setting information. As a result, the mixer 11, even when the number of audio devices used is larger than the number of buses of the mixer 11, is able to cause the bus of the own apparatus to appear to have been extended. In other words, even when the number of audio devices is increased or decreased, the user can recognize that the number of buses is increased or decreased, and thus can cope with ease.

The foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

For example, the present preferred embodiment of the present invention has shown an example in which the virtual matrix bus is displayed in the SENDS ON FADER mode. However, the present invention is not limited to the SENDS ON FADER mode as long as a virtual bus that causes the output channel of the destination device to work as a bus of an own apparatus is displayed.

In addition, the present preferred embodiment of the present invention has shown the amplifier with the mixing function as an example of the destination device. Other than such an amplifier, a powered speaker with the mixing function is an example of the destination device of the present invention.

What is claimed is:

1. An audio signal processing apparatus comprising:
   at least one bus that:
      receives an input audio signal from a plurality of input audio channels; and
      outputs an output audio signal to a plurality of output audio channels;
   a network interface that outputs the output audio signal from the plurality of output audio channels through a network;
   a user interface that receives an operation from a user;
   a display; and
   a processor that implements instructions stored in a memory to execute a plurality of tasks, including:
      an information receiving task that receives, from a destination device to which the output audio signal is output to, via the network interface, information regarding a number of available destination output channels of the destination device;
      a displaying task that controls the display to display:
         the at least one bus representing the plurality of output audio channels; and
         a virtual bus representing the available destination output channels of the destination device, based on the received information regarding the number of the available destination output channels;
      a setting receiving task that receives, via the user interface:
         a first input setting of a first correspondence relationship between the plurality of input audio channels of the input audio signal and the at least one bus; and
         a second input setting of a second correspondence relationship between the plurality of output audio channels of the output audio signal and the virtual bus;
      a setting generating task that generates setting information according to the second input setting;
      an outputting task that causes the at least one bus to output the input audio signal to each of the plurality of output channels according to the first input setting; and
      a sending task that sends the output audio signal and the setting information to the destination device via the network interface.

2. The audio signal processing apparatus according to claim 1, wherein the setting information includes information relating to an output level, with respect to each of the available destination output channels represented in the virtual bus.

3. The audio signal processing apparatus according to claim 2, wherein the user interface includes a fader physical controller that receives an output level for each of the plurality of input audio channels.

4. The audio signal processing apparatus according to claim 1, further comprising:
   an audio interface that receives the input audio signal with the plurality of input audio channels,
   wherein the mixing task mixes the input audio signal of each of the plurality of input audio channels input to the audio interface with the output audio signal.

5. An audio system comprising:
   a destination device; and
   an audio signal processing apparatus connected to the destination device through a network, and comprising:
      at least one bus that:
         receives an input audio signal from a plurality of input audio channels; and
         output an output audio signal to a plurality of output audio channels;
      a network interface that outputs the output audio signal from the plurality of output audio channels through the network;
      a user interface that receives an operation from a user;
      a display; and
      a first processor that implements instructions stored in a first memory to execute a first plurality of tasks, including:
         an information receiving task that receives, from the destination device to which the output audio signal is output to, via the network interface, information regarding a number of available destination output channels of the destination device;
         a displaying task that controls the display to display:
            the at least one bus representing the plurality of output audio channels; and
            a virtual bus representing the available destination output channels of the destination device, based on the received information regarding the number of the available destination output channels;

a setting receiving task that receives, via the user interface:
a first input setting of a first correspondence relationship between the plurality of input audio channels of the input audio signal and the at least one bus; and
a second input setting of a second correspondence relationship between the plurality of output audio channels of the output audio signal and the virtual bus;
a setting generating task that generates setting information according to the second input setting;
a mixing task that causes the at least one bus to output the input audio signal to each of the plurality of output channels according to the first input setting; and
a sending task that sends the output audio signal and the setting information to the destination device via the network interface,
wherein the destination device comprises a second processor that implements instructions stored in a second memory to execute a second plurality of tasks, including:
an information sending task that sends the information regarding the number of the available destination output channels to the audio signal processing apparatus;
a setting information receiving task that receives the output audio signal and the setting information from the audio signal processing apparatus; and
a mixing task that mixes the output audio signal of the plurality of output audio channels with the available destination output channels of the destination device based on the received setting information.

6. A method of processing an audio signal in an audio system comprising:
a destination device; and
an audio signal processing apparatus connected to the destination device through a network and comprising:
at least one bus that:
receives an input audio signal from a plurality of input audio channels; and
outputs an output audio signal to a plurality of output audio channels;
a network interface that outputs the output audio signal from the plurality of output audio channels through the network;
a user interface that receives an operation from a user; and
a display,
wherein the method executed by the audio signal processing apparatus comprises:
receiving, from the destination device to which the output audio signal is output to, via the network interface, information regarding a number of available destination output channels of the destination device;
controlling the display to display:
the at least one bus representing the plurality of output audio channels; and
a virtual bus representing the available destination output channels of the destination device, based on the received information regarding the number of the available destination output channels;
receiving, via the user interface:
a first input setting of a first correspondence relationship between the plurality of input audio channels of the input audio signal and at least one bus; and
a second input setting of a second correspondence relationship between the plurality of output audio channels of the output audio signal and the virtual bus;
generating setting information according to the second input setting;
causing the at least one bus to output the input audio signal to each of the plurality of output channels according to the first input setting; and
sending the output audio signal and the setting information to the destination device via the network interface, and
wherein the method executed by the destination device comprises:
sending the information regarding the number of available destination output channels to the audio signal processing apparatus;
receiving the output audio signal and the setting information from the audio signal processing apparatus; and
mixing the output audio signal of the plurality of output audio channels with the available destination output channels of the destination device based on the received setting information.

7. The method according to claim 6, wherein the setting information includes information relating to an output level, with respect to each of the available destination output channels represented in the virtual bus.

8. The method according to claim 7, wherein the user interface includes a fader physical controller that receives an output level for each of the plurality of input audio channels.

9. The method according to claim 6, wherein:
the audio signal processing apparatus includes an audio interface that receives the input audio signal with the plurality of input audio channels, and
the method further includes causing the audio signal processing apparatus to mix the input audio signal of each of the plurality of input audio channels input to the audio interface with the output audio signal.

* * * * *